Patented Mar. 2, 1926.

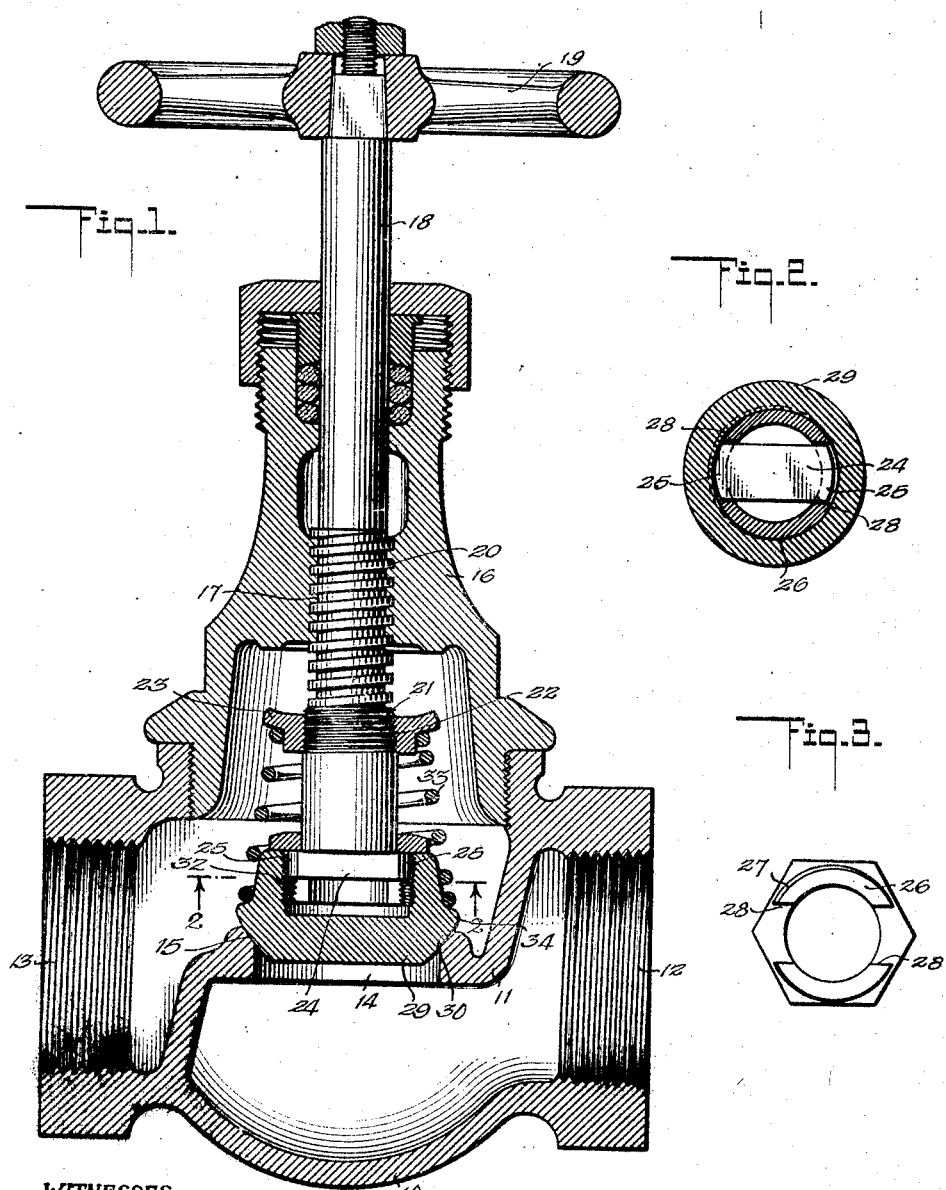

1,575,449

UNITED STATES PATENT OFFICE.

SCON L. MOZIAN, OF NEW YORK, N. Y.

VALVE.

Application filed July 12, 1923. Serial No. 651,145.

*To all whom it may concern:*

Be it known that I, SCON L. MOZIAN, a citizen of the United States, and a resident of the city of New York, Wards Island, borough of Manhattan, in the county of New York and State of New York, have invented a new and Improved Valve, of which the following is a full, clear, and exact description.

This invention has relation to valves and aims for its principal object to provide a connection between the valve plug and the valve stem to permit of a limited rotation of the valve after the same comes in contact with its seat whereby the coacting faces of the seat and valve plug will set up a grinding action to prevent leakage or uneven wearing of said faces.

As a further object the invention contemplates an improvement in valves which does not materially add to the expense of manufacture, which is highly efficient in its purpose and which is comparatively simple in its construction.

With the above recited and other objects in view, the invention resides in the novel construction set forth in the following specification, particularly pointed out in the appended claim and illustrated in the accompanying drawings, it being understood that the right is reserved to embodiments other than those actually illustrated herein to the full extent indicated by the general meaning of the terms in which the claim is expressed.

In the drawings—

Figure 1 is a sectional view through the valve.

Fig. 2 is a detail cross sectional view through the plug and stem connection taken approximately on the line 2—2 of Fig. 1.

Fig. 3 is an end view of the sleeve which connects the plug with the stem.

Referring to the drawings by characters of reference, 10 designates the casing of the valve which is provided with a suitable partition 11 between the inlet 12 and outlet 13. The partition is provided with a communicating opening 14 which is formed with a valve seat 15. The casing 10 is provided with a bearing boss 16 having a threaded bore 17 in axial alignment with the communicating opening 14 and seat 15. The valve stem 18 which extends through the bearing boss 16 is formed with an exteriorly disposed handle 19 at one end and is threaded as at 20 for a portion of its length to coact with the threaded bore 17. The stem is further provided with threads 21 for coacting engagement with the threaded bore 22 of a spring seat 23. The extremity of the stem opposite from the handle 19 is provided with a head 24 having a radially projecting shoulder or shoulders 25. A sleeve 26 is fitted over said extremity of the stem and is provided with peripheral threads 27 and radial slots 28 which receive the projections or shoulders 25. The valve plug 29 is formed with a complementary face 30 to fit the seat 15 and is formed at its opposite side with an axial recess 31 internally threaded as at 32 to receive the peripherally threaded portion 27 of the sleeve 26. A coiled expansion spring 33 surrounds the lower end of the stem and the upper portion of the valve plug, the opposite end convolutions of said spring engaging the annular shoulder 34 on the valve and the spring seat 23 whereby the valve plug 29 is projected from the lower end of the valve stem until the shoulders 25 engage the upper unslotted portion of the sleeve to arrest further movement thereof.

In use and operation turning movement of the stem 18 by the handle 19 moves the stem and valve plug 29 toward the seat 15. As the face 30 of the valve plug comes in contact with the seat 15, further continued rotation of the stem will set up a grinding action on the face 30 against the seat 15 due to the fact that the spring 33 will impinge the valve plug against its seat while the shoulders 25 engaging in the slots 28 will turn the valve plug with the stem while permitting relative axial movement of the head 24 toward the inner end of the recess 31 of the valve plug. When the head 24 is moved axially a sufficient distance to engage the inner end of the recess 31, further movement is arrested.

It therefore follows that a connection between the valve plug and its stem has been provided which permits a limited rotary movement of the valve with respect to the seat after the valve plug is contacted therewith. This will serve to grind the valve plug face and the valve seat face in order to effect even wearing of the surface and afford a better closure. In practice it is intended to construct the valve plug of a softer material than the seat whereby at a small expense the plug may be renewed when worn to such an extent as to be unfit for further use. To this end it will be observed that the valve plug may be readily disconnected from the stem and a new plug substituted therefor.

I claim:

In a valve, a casing having a seat, a valve stem axially movable with respect to the seat upon rotation within the casing, a valve plug carried by the stem, and means of connection between the plug and stem to permit of a limited relative axial movement therebetween when the plug is in engagement with the seat, said means of connection comprising an interiorly threaded axially recessed portion in the plug at the opposite side from its face, a sleeve threadedly engaged in said recess and having longitudinal diametrically disposed slots, the end of the stem extending into said sleeve and provided with radially projecting shoulders engaging in said slots, a spring seat on the stem and a coiled expansion spring having its opposite ends respectively engaging the spring seat and valve plug for normally projecting the plug from the end of the stem, said spring seat being axially adjustable on the valve stem for regulating the tension of the spring.

SCON L. MOZIAN.